June 18, 1929.  E. H. RADFORD  1,717,407
FREEZER
Filed March 20, 1924
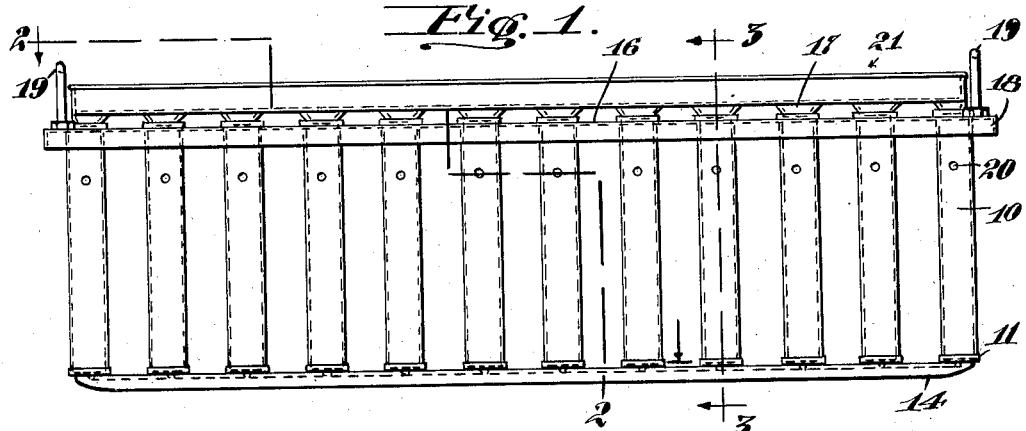
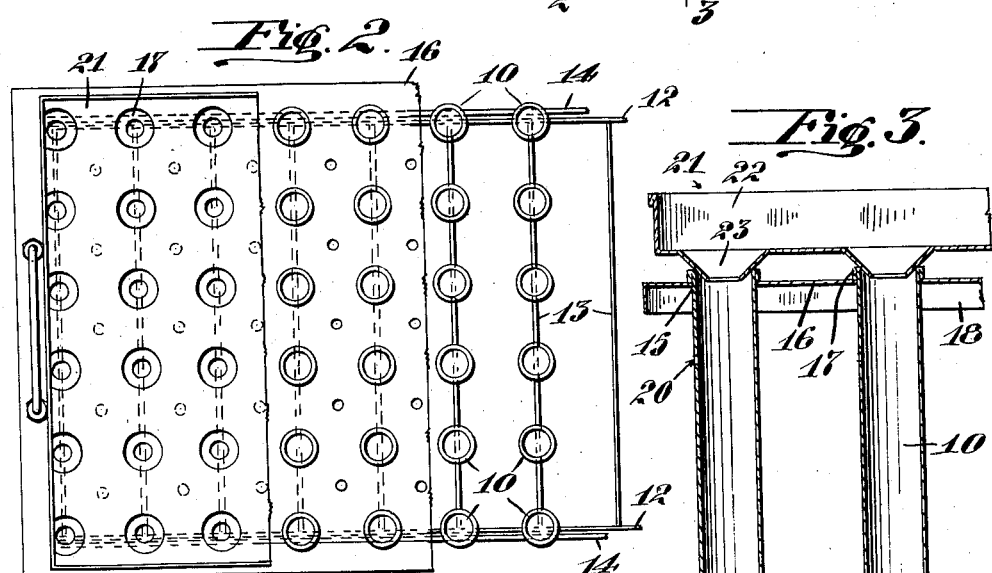
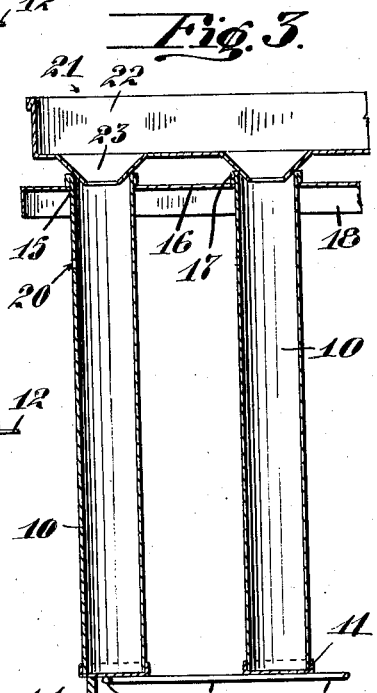
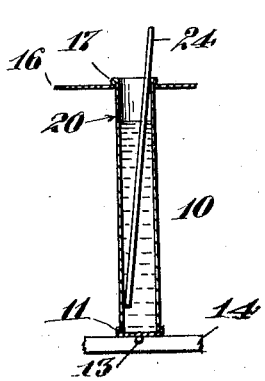
Inventor
Eric H. Radford;
By R. S. Berry
Attorney Patented June 18, 1929.

1,717,407

UNITED STATES PATENT OFFICE.

ERIC H. RADFORD, OF LOS ANGELES, CALIFORNIA.

FREEZER.

Application filed March 20, 1924. Serial No. 700,582.

My invention relates to freezers and particularly to apparatus for freezing confections such as ices of different flavors, namely, the flavors of fruits, etc., and particularly those ices which are frozen on a stick and known in the trade as "Drink on a stick," "Polar suckers," etc.

The general object of my invention is to provide an apparatus of the character above stated by means of which such confections may be quickly frozen on sticks in large quantities and readily removed from the molds of the apparatus and sold or packed for storage and shipping purposes.

With the foregoing objects in view, together with such other objects and advantages as may subsequently appear, my invention resides in the parts, and in the combination, construction and arrangement of parts hereinafter described and claimed, and illustrated by way of example in the accompanying drawings, in which—

Figure 1 is a side elevation of my apparatus.

Figure 2 is a fragmentary horizontal sectional view of my apparatus on the line 2—2 of Figure 1.

Figure 3 is a transverse vertical section of my apparatus, taken on the line 3—3 of Figure 1.

Figure 4 is a vertical longitudinal section of one of the molds of my apparatus, illustrating how the confection such as "Drink on a stick," is frozen in my apparatus.

Figure 5 is a perspective view illustrating a product that may be made in my apparatus.

In the drawings, 10 indicates a plurality of vertical, tubular molds which are spaced apart and may be arranged in any desirable manner, but preferably as shown in the drawings, in which said molds are arranged in six longitudinal rows of twelve molds each, or in twelve transverse rows of six molds each. Said molds taper slightly in a downward direction so that the confection may be readily withdrawn upwardly therefrom, after it is frozen. The lower end of each mold is closed by a cap 11. Longitudinal rods 12 extend under the outer longitudinal rows of molds and are secured to the under side of the caps of the molds on said rows, respectively, and transverse rods 13 extend under the transverse rows of molds and are secured to the caps 11 of the molds of said rows of molds, respectively, thus tying the lower ends of the molds to a framework formed by said rods.

Longitudinal runners 14 extend under the two outermost longitudinal rows of molds and are secured to the caps 11 of the molds on said rows, respectively, outside of the longitudinal connecting rods 12.

The open upper ends 17 of the molds 10 extend into openings 15 in a top plate 16, said upper ends of said molds being welded or otherwise secured to said plate in the openings 15. The plate 16 is formed around its edges with a depending flange 18 which gives the plate rigidity and strength.

Lifting handles 19—19 are secured to the upper side of the plate 16 at the ends thereof, respectively.

The molds are provided with overflow outlets 20 a short distance below their upper ends to prevent the liquid rising above a predetermined level of the molds, and thereby determining the length of the frozen confection.

Means are provided for simultaneously filling all of the molds with a liquid confection to be frozen, being here shown as consisting of a hopper 21 comprising a rectangular pan 22 provided with funnel-shaped outlet spouts 23 in the bottom thereof, said spouts being positioned so that they may all register respectively with the upper ends of the molds 10 when the hopper is placed over said molds, so that a liquid confection placed in the hopper will run out of the pan 22 through all of the spouts 23 simultaneously and fill all of the molds 10 simultaneously with said liquid confection up to the overflow openings 20 through which the surplus liquid confection overflows from said molds, and determines the length of the confection, as indicated in Figure 4 of the drawings.

In operation, the apparatus may be placed in a pan, the hopper 21 being properly placed above the apparatus with the spouts 23 projecting into the upper ends of the molds 10. The pan 22 is supplied with liquid confection so that the same will flow therefrom through the spouts 23 into the molds 10 and fill the same up to the overflow openings 20 from which the surplus liquid will overflow into the pan in which the apparatus rests.

The pan 22 is then removed and a stick 24 is placed in each mold so that it floats in the liquid confection therein with its upper end a short distance above the upper end of the mold, as shown in Figure 4; each mold being elongated vertically and circular in cross section, and of such narrow diameter relatively to its length that the stick will be held therein by the side walls and upper margin thereof in an upwardly extending substantially vertical position with a considerable length of the stick submerged in the liquid in the mold and floating therein.

The apparatus may then be removed from the pan in which it rests and slid on its runners 14 into a freezer, such as a refrigerator, a cooling room, or the like, where the cold circulates around the spaced molds 24 and the liquid confection is frozen in said molds. Upon removal of the apparatus from the freezer the frozen confection may be readily removed from the molds 24 and sold or packed for storage or shipping purposes.

Removal of the frozen stick confection is effected by partly or wholly inverting the apparatus so as to permit the stick confection to discharge from the open upper ends of the molds under gravity, whereby the entire batch of the confections may be ejected in one operation. It will be noted that by the use of the apparatus a large number of separate and individual frozen stick confections may be made in a few simple operations; the multiple molds being filled with a liquid in one operation, the liquid being frozen in the several molds at one time, and the frozen products being easily and quickly removed from the molds by dumping at one operation; and that by employing a number of the freezers a very large output of the finished product will be accomplished with a minimum of labor and in a short time, thus enabling the economical production of the frozen stick confections on a large commercial scale.

I claim—

1. In a freezer for forming frozen stick confections, a plurality of relatively fixed tubular molds arranged in longitudinal rows, straight runners on which the outermost rows of said molds are respectively mounted forming a stable base therefor upon which the freezer may be slid, and means for filling said molds.

2. In a freezer for forming frozen stick confections, a plurality of fixedly connected tubular molds arranged in longitudinal rows, runners on which the outermost rows of said molds are respectively mounted forming a stable base therefor, and a hopper provided with a plurality of outlet spouts adapted to fit into the upper ends of said molds, respectively, when said hopper is placed over said molds.

ERIC H. RADFORD.